UNITED STATES PATENT OFFICE.

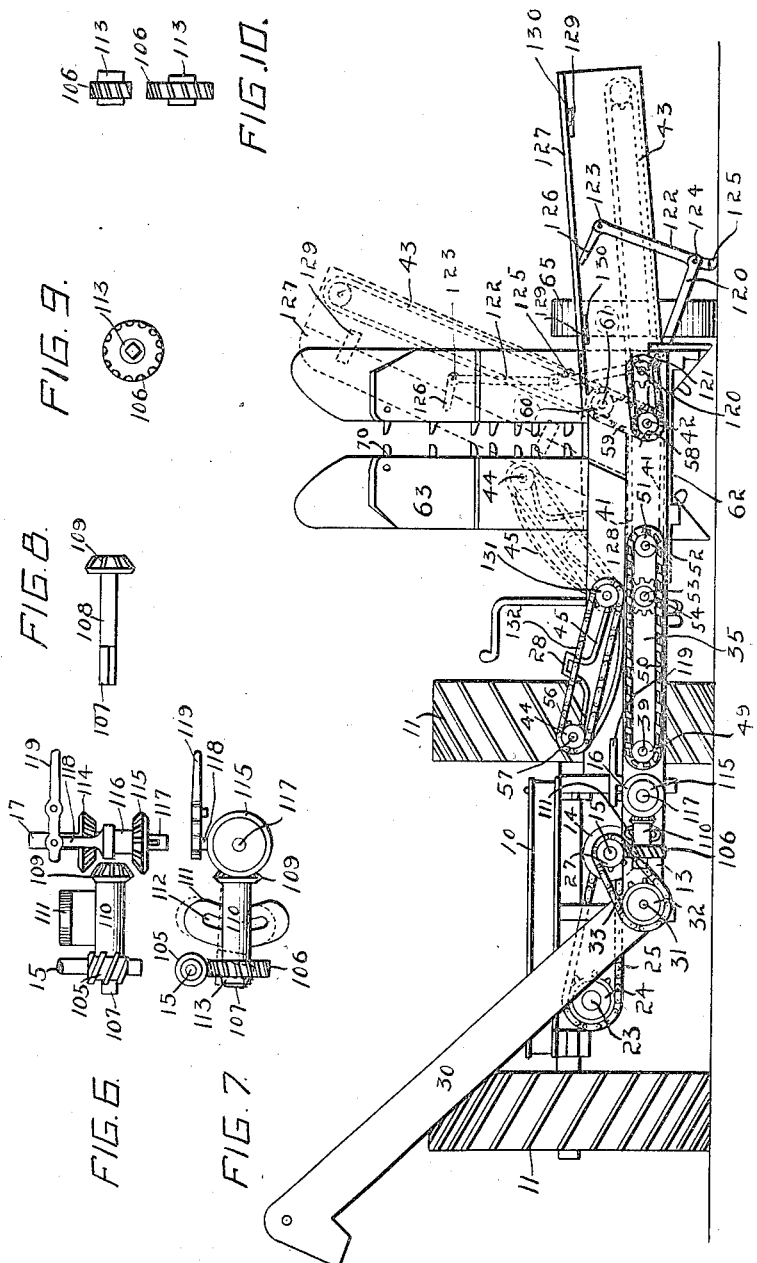

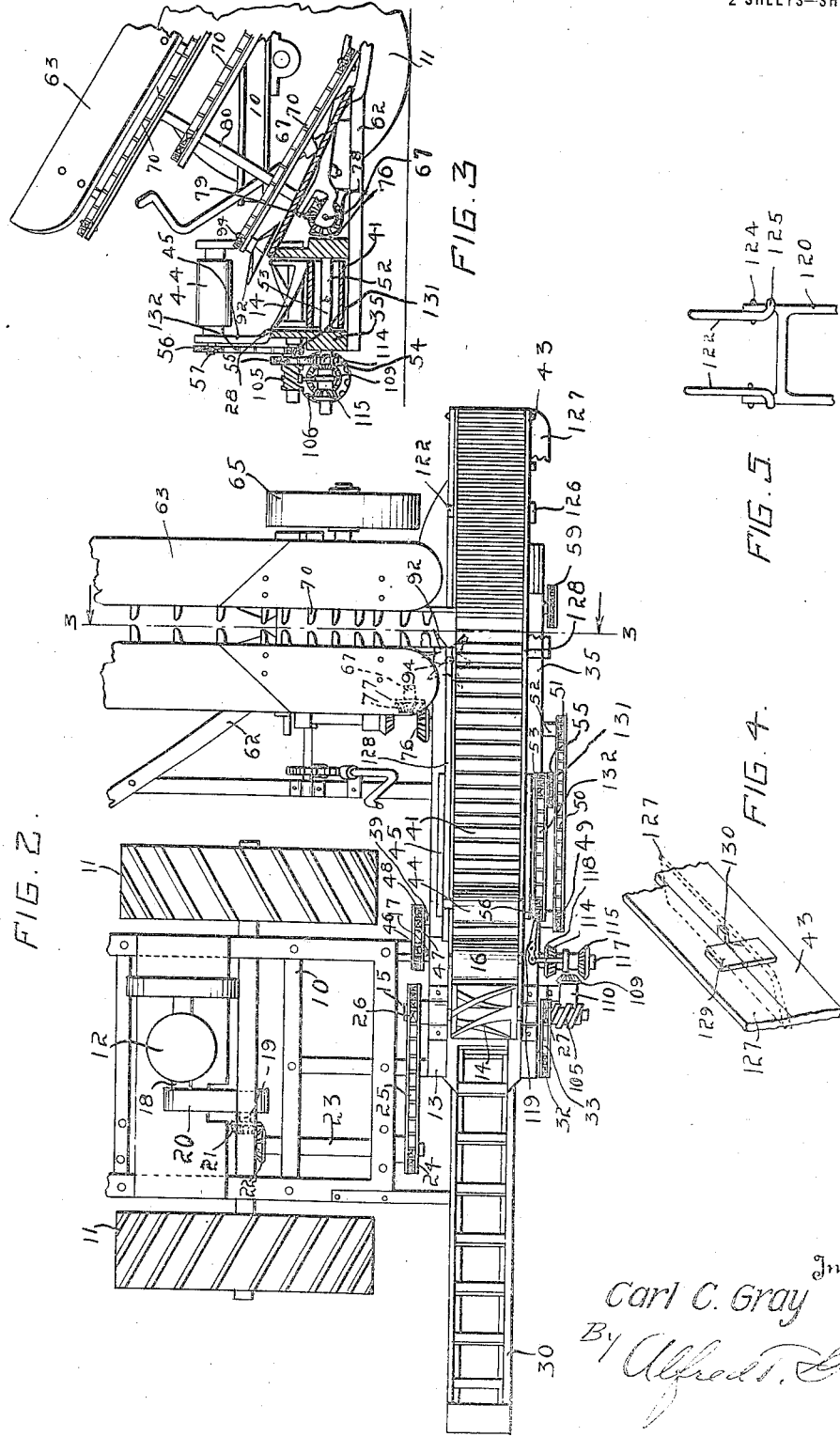

CARL C. GRAY, OF WAPAKONETA, OHIO.

FEEDER FOR ENSILAGE-CUTTERS.

1,280,211.  Specification of Letters Patent.  Patented Oct. 1, 1918.

Original application filed May 31, 1917, Serial No. 172,033. Divided and this application filed November 14, 1917. Serial No. 201,953.

*To all whom it may concern:*

Be it known that I, CARL C. GRAY, a citizen of the United States, residing at Wapakoneta, in the county of Auglaize and State of Ohio, have invented certain new and useful Improvements in Feeders for Ensilage-Cutters, of which the following is a specification.

This invention relates to a feeder for ensilage cutters and particularly to a construction adapted to feed the material to be cut at different rates of speed and comprises a division of my application filed May 31, 1917 Serial No. 172,033 for a similar invention.

The invention has for an object to provide an improved feeding mechanism comprising an adjustable feed table by which material may be fed toward the conveyer belt to the ensilage cutter as delivered from a harvesting mechanism when said table is in a vertically inclined position, and also thereto independent of the harvesting mechanism when said table is in a substantially horizontal position.

The invention also provides an improved construction of adjustable swinging feed roll adapted to coöperate with the feed table when in one position or with the conveying belt when shifted.

Other and further objects and advantages of the invention will be hereinafter set forth and the novel features thereof defined by the appended claims.

In the drawings—

Figure 1 is an end elevation of the invention;

Fig. 2 is a top plan thereof;

Fig. 3 is a section thereof, on line 3—3 of Fig. 2;

Fig. 4 is a detail of one hinge of the side board of the feed table;

Fig. 5 is a detail of the joint in the feed table brace;

Fig. 6 is a top plan of the adjustable driving gears for the feed roller;

Fig. 7 is a side elevation of the same;

Fig. 8 is a detail of the bevel drive gear and shaft;

Fig. 9 is a detail of the changeable speed controlling worm wheel; and

Fig. 10 is a detail edge view of two of these worm wheels.

Like numerals of reference indicate like parts in the several figures of the drawings.

The numeral 10 designates the tractor or other supporting frame which may be of any desired construction and provided with the usual tractor wheels 11 and any form of motor 12. The frame has rigidly secured thereto at its rear a cutter frame 13 upon which the members of any preferred form of ensilage cutter or other device are mounted. These comprise generally the cutter cylinder 14 carried by the shaft 15 mounted in the frame 13 and the feed roller 16 upon shaft 17 similarly mounted.

The cutting mechanism may be of any desired character and driven by any ordinary connections, for instance the motor shaft 18 is connected to a countershaft 19 by a belt 20. The shaft 19 is provided with a bevel gear 21 meshing with a similar gear 22 on shaft 23. The latter is provided with a sprocket 24 connected by chain 25 with a sprocket 26 on cutter shaft 15.

In order to vary the length of ensilage cut and reverse the direction of movement of the feed roller thereto an adjustable driving connection is provided between the roller and cutter shaft. It will be seen that the faster the rotation of the feed roller relative to the cutter the longer will be the lengths of material cut, while a relatively slower speed of this roller effects a shorter cut. A simple construction for this purpose comprises a worm gear 105 on shaft 15 of the cutter meshing with a worm wheel 106 removably secured upon the angular end 107 of a drive shaft 108 carrying at its opposite end a bevel gear 109. This shaft is journaled in a collar 110 carried by an adjustable slotted bracket 111 mounted upon the cutter frame. The curved slot 112 in this bracket permits its adjustment in an arc, as shown by dotted lines in Fig. 7, to compensate for the difference in size of the worm wheels 106 used to effect the different relative speeds of rotation of the cutter and feed roller. As shown in Fig. 10 each of these changeable wheels are formed on a sleeve 113, at different distances from one end thereof whereby the smaller size is located near the end of shaft 108 and each successive larger size when substituted farther inward thereon. Only one worm wheel 106 is attached to the shaft 108 which is removed when it is desired to employ a worm wheel of a different size.

The beveled gear 109 is mounted to have a driving mesh with either bevel gear 114 or 115 secured at the opposite ends of a sleeve 116 suitably keyed to slide upon the end 117 of shaft 17. This shifting for the reversal of the feed roller may be effected by a connection 118 from the sleeve to a pivoted lever 119 upon a fixed part.

The frame 13 also supports a delivery conveyer 30 driven by shaft 31 carrying a sprocket 32 from which a chain 33 extends to a sprocket 27 on the cutter shaft 15. A conveyer frame 35 is mounted upon the frame 13 in any desired manner and may be supported at its outer end by a traction wheel 65. The frame 35 has mounted thereon the conveyer belt 41 which extends over and is driven by the shaft 39 at one end and by the shaft 42 at the opposite end. At the outer end of the conveyer belt an inclined feed table and conveyer 43 is pivotally mounted and when in the vertical position, shown by dotted lines in Fig. 1, is adapted to feed downward toward the belt 41 material delivered thereto from a harvester or other mechanism, but when in the substantially horizontal full line position forms a feed table independent of said harvester when the latter is at rest and the parts used solely as an ensilage cutter. This table may be supported in any desired manner, such as the jointed brace formed of the lower member 120 pivoted at 121 to the conveyer frame and the upper arms 122 pivoted at 123 to the table. These members are pivoted together at 124 and the arms formed with lateral stops 125 to support the parts when in vertical position, as shown in Figs. 1 and 5.

From the pivot 123 a supporting finger 126 extends at an angle to the arm 122 and is disposed to hold a side board 127 in vertical position when the table is raised. This board extends beyond the delivery from the harvesting mechanism to direct and confine the stalks between the sides 128 above the conveyer 41. The board 127 is pivoted to the table to swing outward by means of the hinges 129, one member of which is formed with a supporting stop 130. It will be seen that when the table is swung downward the finger 126 moves away from the board 127 permitting the latter to swing outward and form a side feeding surface along the table which is supported in its horizontal position by the stops 125 at the lower end of the arm 122.

Above the conveyer belt 41 a driven feed roll 44 is carried by swinging arms 45 having supporting legs 28 resting upon the sides 128 when arranged in the dotted line position of Fig. 1, so that the roller coöperates with the feed table and its side board to effect a contacting force feed of the stalks endwise of the belt and toward the cutter. When in the full line position shown this feed roll is supported by its arms 45 resting upon the sides of the conveyer frame 35 and coöperates with the upper face of the conveyer belt 41 to retain stalks horizontally thereon during their travel toward the cutter. This adjustment is particularly desirable for use when feeding independent of a harvesting mechanism. The feed roll is shown as one form of means to accomplish this function but any other form of feeding device adapted to effect the same action may be used.

The conveying members may be driven in any preferred manner, for example, the shaft 17 is provided with a sprocket 46 having a chain 47 extending to a sprocket 48 on shaft 39. This shaft also carries a sprocket 49 from which a chain 50 extends to a sprocket 51 on cross shaft 52. This chain also drives a sprocket 53 upon a stub-shaft carrying a gear 54 which meshes with a gear 55 upon a shaft at the pivot of the arms 45, Fig. 3. This latter shaft carries a sprocket 131 from which a chain 132 extends to a sprocket 56 on the shaft 57 of the feed roll. The feed conveyer may be driven from the shaft 42 by the sprocket 58 thereon from which a belt 59 extends to a sprocket 60 upon the driving shaft 61 for the conveyer.

The conveyer frame 35 is provided with an extension 62 for supporting any desired form of harvesting mechanism 63 the gathering chains 70 of which are arranged to deliver material to the feeding members for the ensilage cutter. At this point of delivery the butts of the stalks are turned toward the cutter by a spiked or star wheel 92 on shaft 94 which is driven toward the conveyer by one of the gatherer chains, Fig. 3. These chains may be driven by a bevel gear 76 on shaft 52 meshing with a coöperating gear 77 on shaft 67. The latter shaft has beveled gears 78 thereon meshing with gears 79 on the shafts 80 common to all of the gathering chains.

In the operation of the invention with the parts in the full line position of Fig. 1, the material is disposed upon the feed table when in a horizontal position by hand and fed therefrom to the conveyer belt upon which it is held and fed by the driven feed roll until delivered to the feed roller at the ensilage cutter. This roller and cutter are relatively driven by an adjustable or changeable connection to provide for different relative speeds of the cutter and all the feeding members thereto so that different lengths of stalk may be cut for ensilage, and is also formed with means by which the direction of travel of the feed roller to the cutter may be reversed in case of clogging. While the relative speed of rotation of the feed roller and cutter determine the length of ensilage to be cut, still there is a continuous feed of material upon the conveyer toward said roller and this must be controlled to prevent the collection of material at that point if this roller travels at a less speed than the conveyer. In order to adapt the means for regulating the length of ensilage to be cut to the continuous feed from the conveyer it is necessary to regulate the drive of the latter relative to the feed roller. The reversing of the drive of the feed roller also reverses the conveyer to prevent jamming or choking at the roller which is liable to occur when a too large feed of stalk butts is given and especially in case the roots of the stalk are accidentally torn up by the harvester and fed to the cutter.

In the operation of the invention when in the dotted line position of Fig. 1, the stalks are cut by the harvester and fed backward by the gathering chains. Their butts are then turned toward the ensilage cutter so that they fall with their heads upon the inclined feed table. This table and the coöperating feed roll form a force feed for the stalks forward upon the conveyer with their butts in proper position to engage the cutter from which they are discharged to the delivery conveyer. This table and roll are provided with improved means for supporting them in their shifted or adjusted positions and the former has pivoted at its outer edge a side board which acts when raised to assist in controlling the feed to the conveyer and when lowered forms a side feed to the table.

The parts hereinbefore described may be mounted upon any suitable form of fixed or movable support and driven from any preferred source of power. Any desired construction of harvester, conveyers, and ensilage cutter may be used, as the invention herein relates to the novel construction of the feeding mechanism and its coöperative relation to the cutting device or other means for further treatment of the material.

What I claim is:—

1. A stalk conveyer, a driven feed table conveyer disposed at the receiving end thereof, and means for delivering the stalk in substantially vertical position upon the face of the stalk conveyer at its receiving end so that the lower portion of the stalk is carried in the direction of travel of the stalk conveyer and its upper portion deposited upon the feed table conveyer.

2. A conveyer, a feed table conveyer geared to said first mentioned conveyer and disposed at the receiving end thereof, means for delivering material at the junction of said conveyers, and a feed roll driven from and disposed above the first mentioned conveyer and shiftable to coöperate therewith or with the table conveyer.

3. A stalk conveyer, a driven feed table conveyer disposed at the receiving end thereof and inclined thereto, and means extending laterally from the stalk conveyer for delivering the stalk upon the face thereof at its receiving end in a substantially vertical position so that the lower portion of the stalk is carried in the direction of travel of the stalk conveyer and its upper portion deposited upon the feed table conveyer.

4. A conveyer, a feed table conveyer disposed at the receiving end of the first mentioned conveyer, and driven feeding means disposed above the first mentioned conveyer and mounted upon pivoted supports arranged to swing to either side of their pivot and engage the conveyer frame in their downward movement to permit coöperation with either of said conveyers.

5. A conveyer, a feed table conveyer pivotally mounted at the receiving end of the first mentioned conveyer, means for supporting said table conveyer in a vertically inclined position above the plane of the first mentioned conveyer, and means for delivering material at the junction of said conveyers.

6. A conveyer, a feed table conveyer pivotally mounted at the receiving end of the first mentioned conveyer, means for supporting said table conveyer in a vertically inclined position above the plane of the first mentioned conveyer, means for delivering material at the junction of said conveyers, and a pivoted side board for said table conveyer arranged to permit a lateral feed thereto.

7. A conveyer, a feed table conveyer disposed at the receiving end of said first mentioned conveyer and inclined from the vertical above the plane of the same, means for delivering material at the junction of said conveyers, and driven feeding means carried by pivotal supports and coöperating with said table conveyer to effect a force feed.

8. A conveyer, a feed table conveyer disposed at the receiving end of said first mentioned conveyer and inclined from the vertical above the plane of the same, means for delivering material at the junction of said conveyers, and driven feeding means mounted upon pivotal supports and shiftable to swing to either side of their pivots to coöperate with the upper face of the first mentioned conveyer or with said table conveyer.

9. The combination of a conveyer, a feed table conveyer disposed at the receiving end thereof and adjustable from a position inclined from the vertical above the plane of the first mentioned conveyer to a substantially horizontal position in the same plane therewith, and means for delivering material at the junction of said conveyers.

10. The combinaion of a conveyer, a feed table conveyer disposed at the receiving end thereof and shiftable from a position inclined from the vertical to a substantially horizontal position in the plane of the first mentioned conveyer to feed directly thereto, and a coöperating feeding mechanism delivering to the receiving end of the first mentioned conveyer at the base of the table conveyer.

11. The combination of a conveying belt, a traveling feed table conveyer disposed at the receiving end thereof and shiftable into a substantially vertical position above the plane of the belt or into a substantially horizontal position in the plane thereof, and a driven pivoted feed roll shiftable about its pivot for coöperation with the table conveyer in its vertical position or with said belt when the conveyer is in horizontal position.

12. A conveying belt, a driving shaft for said belt having a connection with the shaft of said roller, a feed table conveyer at the receiving end of the belt and driven therefrom, and a feed roll mounted above the belt and driven therefrom and shiftable about its pivot to coöperate with either said belt or conveyer.

13. The combination of a conveying belt, a feed table conveyer pivoted at the receiving end of said belt and shiftable from a substantially horizontal position in the plane thereof to a vertically inclined position above the plane of the belt, a pivoted side board at the outer side edge of the conveyer table, and means to automatically retain said board in raised position when the table is vertically inclined and release the board when said table is lowered.

14. The combination of a conveying belt, a feed table conveyer pivoted at the receiving end of said belt and shiftable from a substantially horizontal position in the plane thereof to a vertically inclined position above the plane of the belt, a pivoted side board at the outer edge of said conveyer table, and means to support said table in either position having a member arranged to automatically retain or release said side board.

15. The combination of a conveying belt, a feed table conveyer pivoted at the receiving end of said belt and shiftable from a substantially horizontal position in the plane thereof to a vertically inclined position above the plane of the belt, a pivoted side board at the outer edge of said conveyer table, a jointed brace pivoted to said table and a fixed part and constructed to support the table in either position, and a member carried by said brace to automatically engage said board as the table is raised to vertical position.

16. The combination of a conveying belt, a feed table conveyer pivoted at the receiving end of said belt and shiftable from a substantially horizontal position in the plane thereof to a vertically inclined position above the plane of the belt, a pivoted side board at the outer edge of said conveyer table, a jointed brace arranged to support the table in either position, and an arm from the pivot of said brace upon the table disposed to engage said board when the table is vertically inclined.

17. The combination of a conveying belt, a feed table conveyer pivoted at the receiving end of said belt and shiftable from a substantially horizontal position in the plane thereof to a vertically inclined position above the plane of the belt, a brace disposed to support said table in either position and comprising two members one pivoted to the table and the other to a fixed part, means for pivoting these members together so that the lower end of the member pivoted to the table may support the same when horizontal, and a stop carried by one member at their pivot and disposed to engage the other member when the table is raised.

18. The combination of a conveying belt, a feed table conveyer pivoted at the receiving end of said belt and shiftable from a substantially horizontal position in the plane thereof to a vertically inclined position above the plane of the belt, a pivoted side board at the outer edge of said table arranged to swing outward to form a feeding surface, a brace to support said table in either position comprising two members pivoted together and to the table and a fixed part, and an angle arm carried by the brace at its table pivot and disposed to engage and retain said board when the table is vertically inclined.

19. The combination of a conveying belt, a feed table conveyer pivoted at the receiving end of said belt and shiftable from a substantially horizontal position in the plane thereof to a vertically inclined position above the plane of the belt, a side board disposed at the outer edge of said table to form a feeding surface, and a pivotal hinge for said board having a stop formed upon one member to support the board in said horizontal position.

20. The combination of a conveying belt, a feed table conveyer at the receiving end of said belt adapted to be supported in a vertically inclined position above the plane thereof, a feed roll carried by pivoted arms above said belt and shiftable to either side of its pivotal center, and means upon said arms to engage the sides of the belt frame and support said roll in coöperative relation to either said belt or table conveyer.

21. The combination of a conveying belt, a feed table conveyer at the receiving end of said belt and adapted to be supported in a vertically inclined position above the plane thereof, a feed roll carried by pivoted arms above said belt and shiftable to either side of its pivotal center, a driving gear disposed at said pivotal center and driven from said belt, and a chain extending from said gear to a gear upon the shaft of said roll at the free ends of said arms.

22. The combination of a horizontally disposed conveyer, a feed table conveyer pivoted beyond the receiving end thereof and disposed in the same horizontal plane, means for shifting the outer end of said table conveyer from the plane of the first mentioned conveyer to a vertically inclined position above the same, and a feed roll mounted above and driven by the first mentioned conveyer and shiftable to coöperate with either conveyer.

23. The combination of a conveyer for feeding material, means independent of the conveyer for turning the lower ends of material into the direction of travel thereof, and a driven feed table conveyer disposed at the receiving end of the first mentioned conveyer to feed the upper ends of material thereto.

24. The combination of a conveyer for feeding material, means independent of the conveyer for turning the lower ends of material endwise thereto, an inclined driven feed table conveyer at the receiving end of the first mentioned conveyer, and a driven feed roll disposed opposite said table conveyer to coöperate therewith in its feeding action.

25. The combination of a conveyer for feeding material, means independent of the conveyer for turning the lower ends of material endwise thereto, an inclined driven feed table conveyer at the receiving end of the first mentioned conveyer, a driven feed roll disposed opposite said table conveyer to coöperate therewith in its feeding action, means to permit the shifting of said roll to coöperate with said first mentioned conveyer, and means for shifting said table conveyer into a horizontal position.

In testimony whereof I affix my signature in the presence of two witnesses.

CARL C. GRAY.

Witnesses:
J. BURTON WELLS,
C. E. BLANK.